United States Patent
Zimmel et al.

(10) Patent No.: US 12,019,283 B2
(45) Date of Patent: Jun. 25, 2024

(54) FIBER OPTIC CONNECTOR WITH ANTI-WICKING EPOXY TUBE

(71) Applicant: COMMSCOPE TECHNOLOGIES LLC, Hickory, NC (US)

(72) Inventors: Steven Conrad Zimmel, Minneapolis, MN (US); Gregory J. Schaible, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 244 days.

(21) Appl. No.: 17/627,597

(22) PCT Filed: Jul. 16, 2020

(86) PCT No.: PCT/US2020/042368
§ 371 (c)(1),
(2) Date: Jan. 14, 2022

(87) PCT Pub. No.: WO2021/011794
PCT Pub. Date: Jan. 21, 2021

(65) Prior Publication Data
US 2022/0276451 A1 Sep. 1, 2022

Related U.S. Application Data

(60) Provisional application No. 62/875,366, filed on Jul. 17, 2019.

(51) Int. Cl.
*G02B 6/38* (2006.01)
*G02B 6/36* (2006.01)
*G02B 6/46* (2006.01)

(52) U.S. Cl.
CPC ....... *G02B 6/38875* (2021.05); *G02B 6/3616* (2013.01); *G02B 6/387* (2013.01);
(Continued)

(58) Field of Classification Search
CPC ...... G02B 6/562; G02B 6/3616; G02B 6/387; G02B 6/3898; G02B 6/3897
See application file for complete search history.

(56) References Cited

U.S. PATENT DOCUMENTS 5,058,984 A * 10/1991 Bulman ............... G02B 6/3869
385/80
5,096,276 A 3/1992 Gerace et al.
(Continued)

FOREIGN PATENT DOCUMENTS

CN 101091131 A 12/2007
CN 104169764 A 11/2014
(Continued)

OTHER PUBLICATIONS

International International Search Report and Written Opinion of the International Searching Authority for International Patent Application No. PCT/US2020/042368 dated Nov. 5, 2020, 10 pages.
(Continued)

*Primary Examiner* — Ryan A Lepisto
*Assistant Examiner* — Erin D Chiem
(74) *Attorney, Agent, or Firm* — Merchant & Gould P.C.

(57) ABSTRACT

Aspects and techniques of the present disclosure relate to fiber optic connectors with features that help eliminate the potential of a capillary effect or epoxy wicking. The fiber optic connector may include an epoxy tube with segments that define a pocket in an area that helps to prevent capillary action between components that are otherwise closely positioned.

25 Claims, 12 Drawing Sheets

(52) U.S. Cl.
CPC ......... *G02B 6/3893* (2013.01); *G02B 6/3897* (2013.01); *G02B 6/3898* (2013.01); *G02B 6/562* (2023.05)

(56) References Cited

U.S. PATENT DOCUMENTS

| | | |
|---|---|---|
| 5,181,267 A | 1/1993 | Gerace et al. |
| 5,317,663 A | 5/1994 | Beard et al. |
| 5,375,183 A | 12/1994 | Edwards et al. |
| 5,428,703 A | 6/1995 | Lee |
| 5,611,012 A * | 3/1997 | Kuchenbecker ..... G02B 6/3889 385/139 |
| 5,682,451 A | 10/1997 | Lee et al. |
| 5,778,126 A | 7/1998 | Saitoh |
| 6,142,676 A | 11/2000 | Lu |
| 6,155,146 A | 12/2000 | Andrews et al. |
| 6,629,782 B2 | 10/2003 | McPhee et al. |
| 7,281,859 B2 | 10/2007 | Mudd et al. |
| 7,997,806 B2 | 8/2011 | Nakagawa |
| 8,496,386 B2 | 7/2013 | Kerr et al. |
| 8,858,090 B2 | 10/2014 | Henke et al. |
| 9,057,849 B2 | 6/2015 | Park et al. |
| 9,684,138 B2 * | 6/2017 | Lu ................. G02B 6/3889 |
| 11,150,412 B2 | 10/2021 | Zimmel et al. |
| 11,187,859 B2 * | 11/2021 | Rosson ................. G02B 6/3831 |
| 2002/0081077 A1 | 6/2002 | Nault |
| 2003/0147598 A1 | 8/2003 | McPhee et al. |
| 2004/0151437 A1 | 8/2004 | Marrs et al. |
| 2005/0232553 A1 | 10/2005 | Holmquist |
| 2005/0232554 A1 | 10/2005 | Zimmel et al. |
| 2006/0115219 A1 | 6/2006 | Mudd et al. |
| 2007/0183721 A1 | 8/2007 | Holmquist et al. |
| 2009/0214164 A1 | 8/2009 | Nakagawa |
| 2011/0008003 A1 | 1/2011 | Tamekuni et al. |
| 2011/0075972 A1 | 3/2011 | Parkman, III |
| 2013/0089294 A1 | 4/2013 | Zimmel |
| 2013/0315541 A1 | 11/2013 | Nhep et al. |
| 2013/0322826 A1 | 12/2013 | Henke et al. |
| 2018/0059334 A1 | 3/2018 | Lu et al. |
| 2018/0224608 A1 | 8/2018 | Liu et al. |
| 2022/0260788 A1 | 8/2022 | Zimmel et al. |
| 2022/0269014 A1 | 8/2022 | Holmquist et al. |
| 2022/0357523 A1 | 11/2022 | Zimmel et al. |

FOREIGN PATENT DOCUMENTS

| | | |
|---|---|---|
| CN | 109716194 A | 5/2019 |
| WO | 2014/031556 A1 | 2/2014 |

OTHER PUBLICATIONS

Extended European Search Report for Application No. 20840593.6 dated Oct. 9, 2023.
Extended European Search Report for Application No. 20841353.4 dated Jul. 14, 2023.
Partial Supplementary European Search Report for Application No. 20840593.6 dated Jul. 4, 2023.
International Search Report and Written Opinion of the International Searching Authority for International Patent Application No. PCT/US2020/041955 dated Nov. 5, 2020, 14 pages.
International International Search Report and Written Opinion of the International Searching Authority for International Patent Application No. PCT/US2020/042135 dated Nov. 5, 2020, 9 pages.
International International Search Report and Written Opinion of the International Searching Authority for International Patent Application No. PCT/US2020/42152 dated Nov. 6, 2020, 9 pages.

* cited by examiner

FIBER OPTIC CONNECTOR WITH ANTI-WICKING EPOXY TUBE

CROSS-REFERENCE TO RELATED APPLICATION

This application is a National Stage Application of PCT/US2020/042368, filed on Jul. 16, 2020, which claims the benefit of U.S. Patent Application Ser. No. 62/875,366, filed on Jul. 17, 2019, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic connectors can include single fiber connectors and multi-fiber connectors. When two fiber optic connectors are interconnected, their respective optical fibers are coaxially aligned such that the end faces of the optical fibers directly oppose one another. In this way, an optical signal can be transmitted from optical fiber to optical fiber through the aligned end faces of the optical fibers.

Epoxy tubes may be used in fiber optic connectors to help with epoxy and fiber insertion. Epoxy tubes can be made with fluoropolymers that have very low surface energy to help resists any capillary effect in the fiber optic connector between the epoxy tube and a buffer tube. However, if an epoxy tube is made of a different material, the capillary effect may increase compared to fluoropolymers epoxy tubes.

Improvements are desirable with respect to the design of a fiber optic connector that has anti-wicking features.

SUMMARY

The present disclosure generally relates to fiber optic connectors with features that help eliminate the potential of a capillary effect or epoxy wicking. In some fiber optic connectors, epoxy tubes are used to help with epoxy and fiber insertion. The epoxy tube may have an inner diameter that is close in size to an outer diameter of a buffer or furcation tube. Such small clearance between the inner diameter of the epoxy tube and the buffer tube can cause a capillary effect. The capillary effect can result in too much epoxy wicking out of a hub of the fiber optic connector. For example, the capillary effect can cause the epoxy to be re-deposited in a problematic location of the epoxy tube (tip) or even outside of the epoxy tube. The capillary effect can also result in there being too little epoxy in the hub.

One aspect of the present disclosure relates to an epoxy tube that includes segments that define a pocket in an area that helps to prevent capillary action between components that are otherwise closely positioned.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
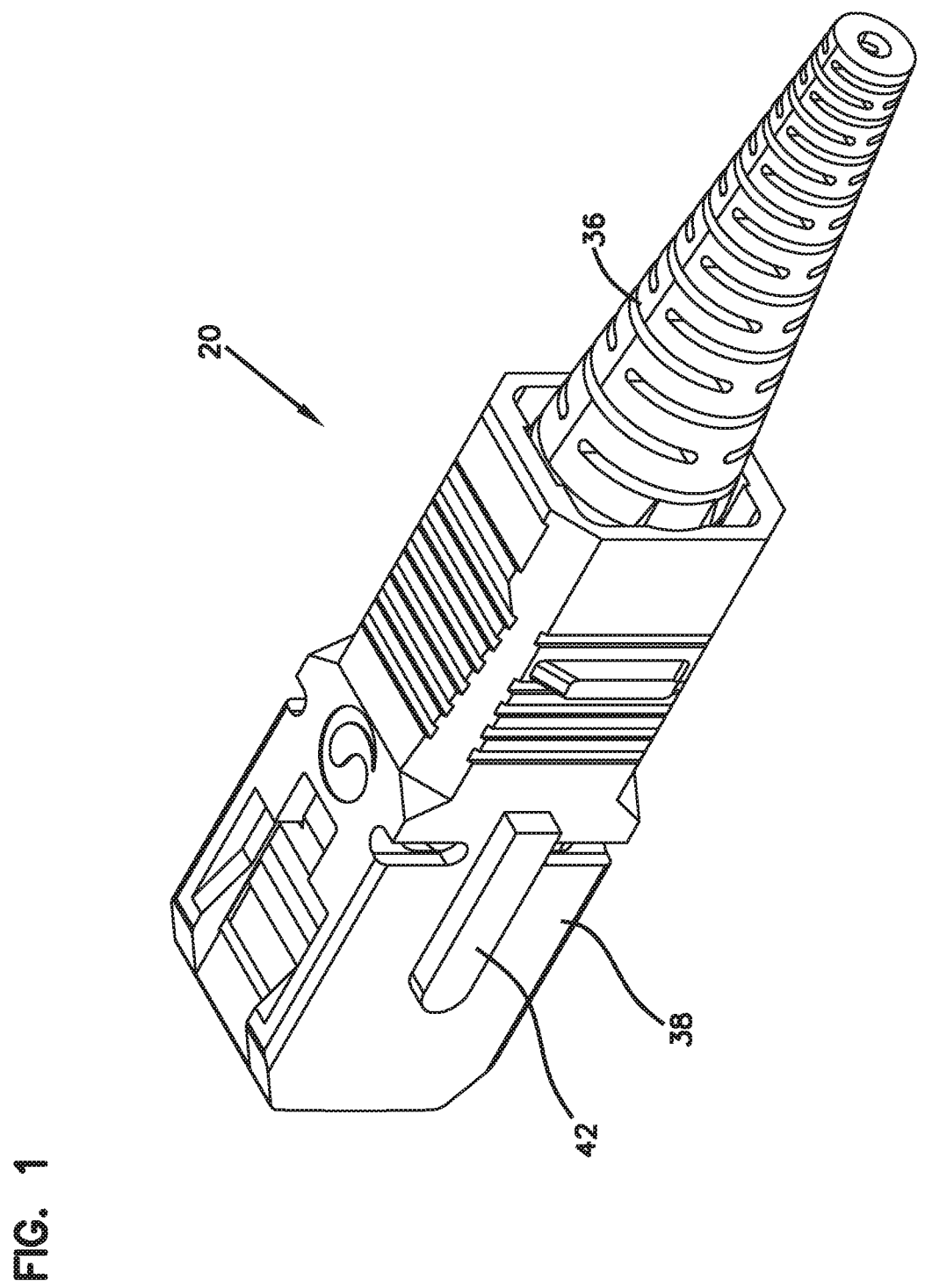
FIG. 1 is a rear perspective view of an example fiber optic connector in accordance with principles of the present disclosure.
Figure 2:
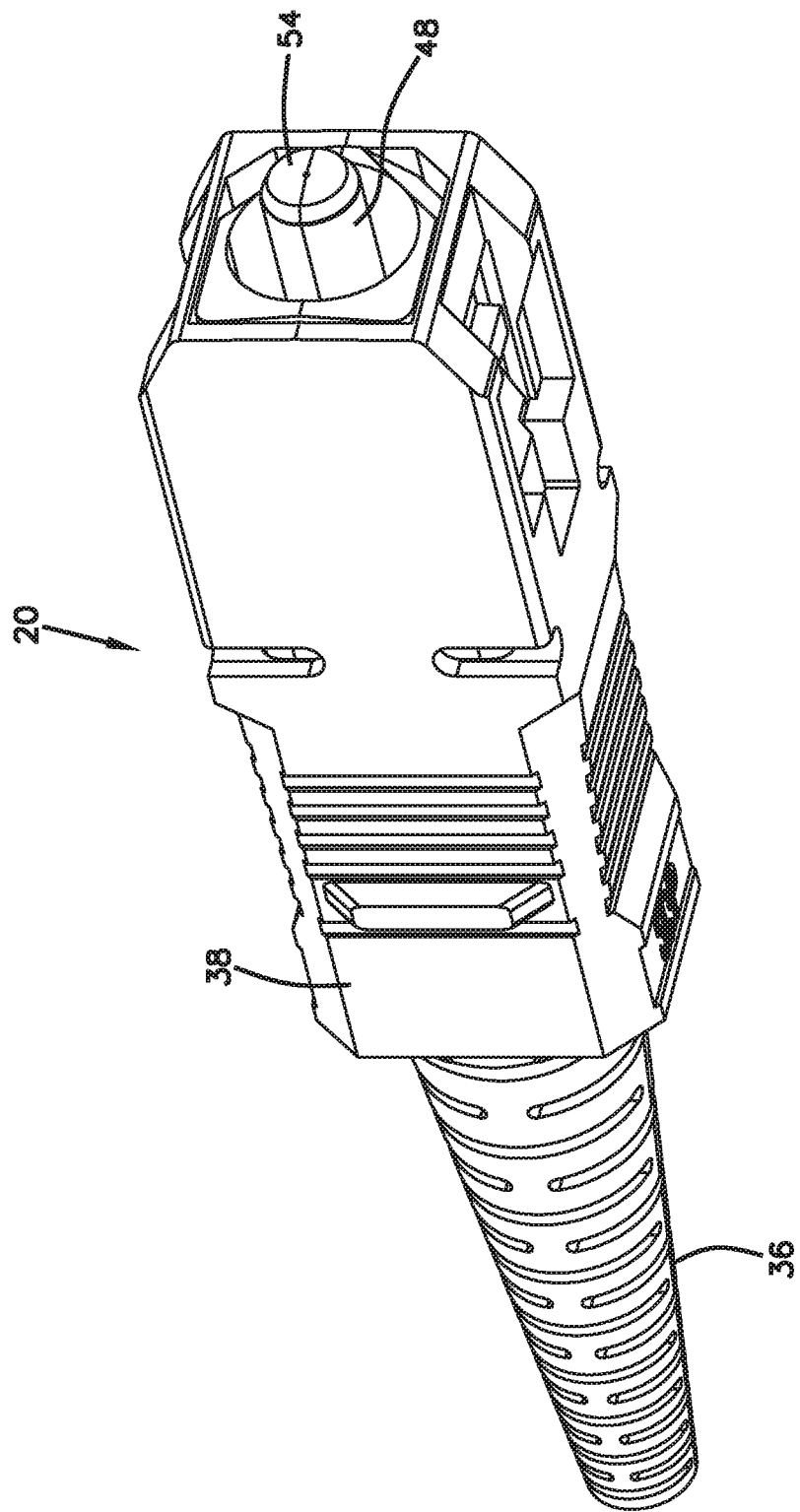
FIG. 2 is a front perspective view of the fiber optic connector of FIG. 1.
Figure 3:
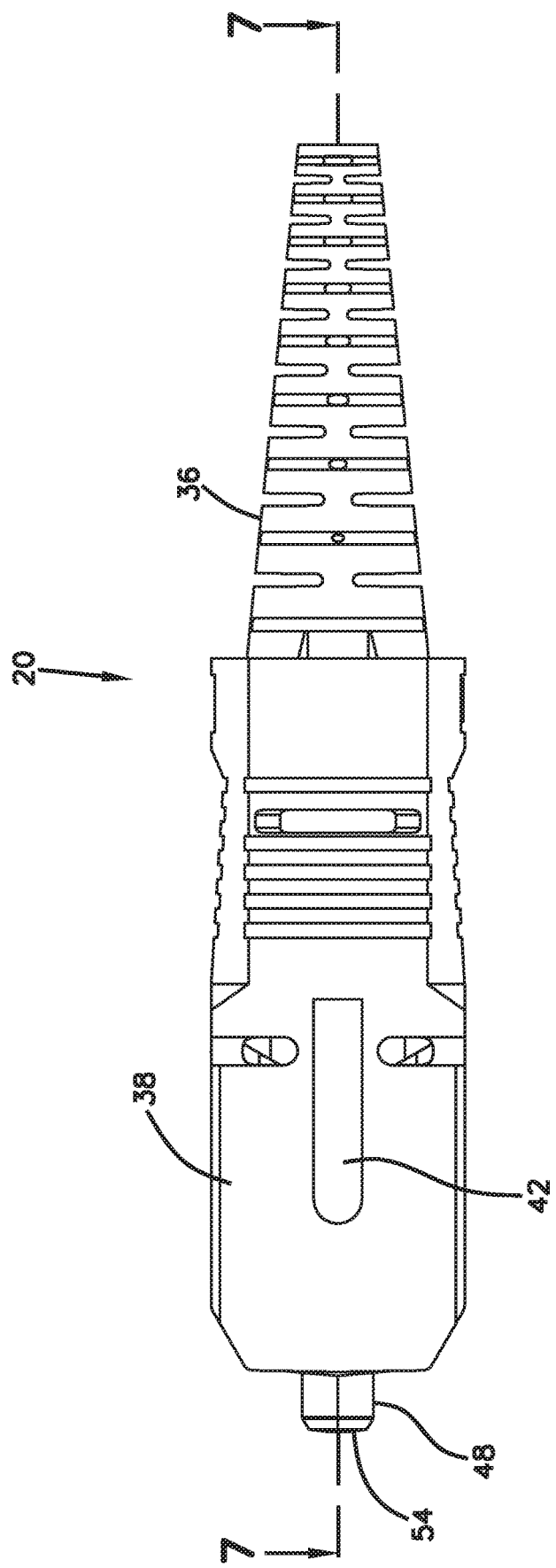
FIG. 3 is a top view of the fiber optic connector of FIG. 1.
Figure 4:
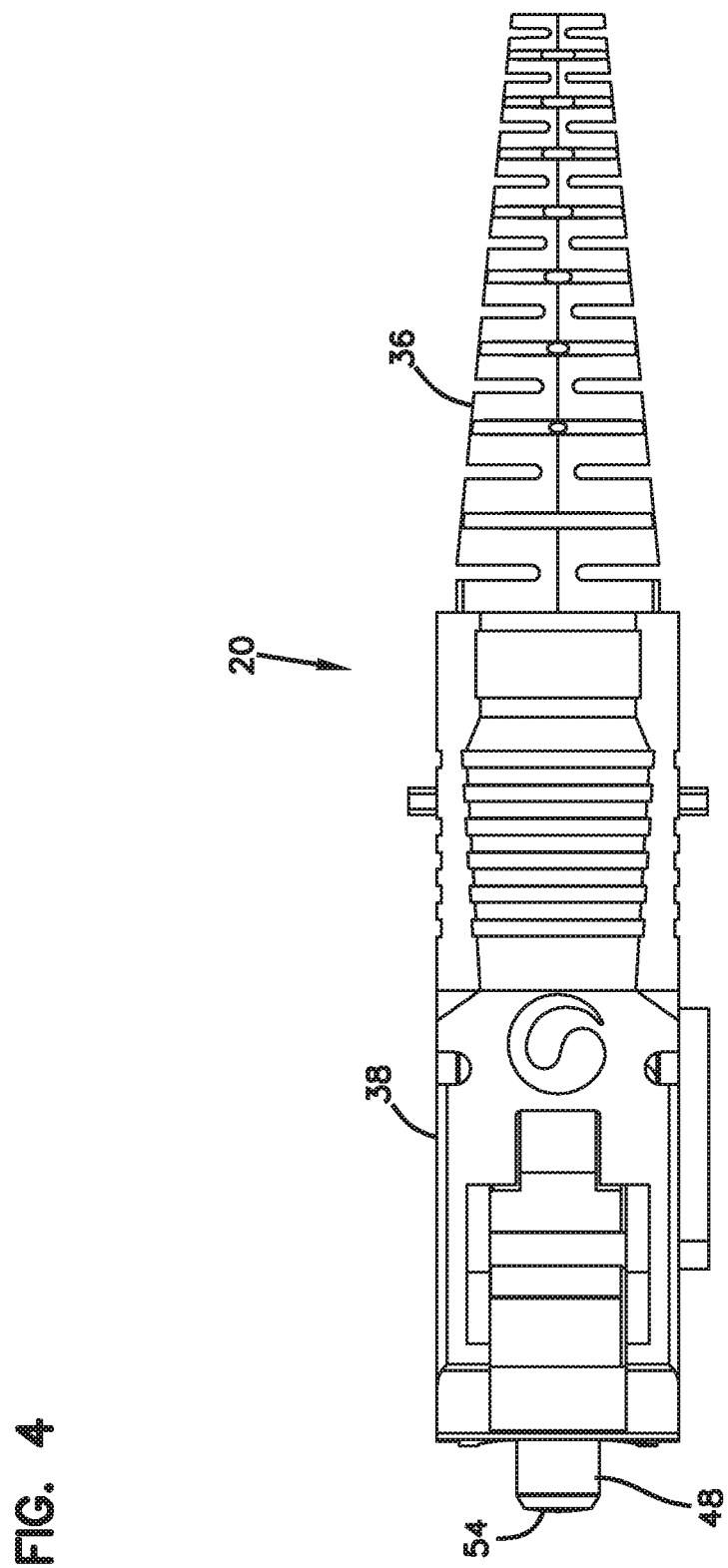
FIG. 4 is a side view of the fiber optic connector of FIG. 1.
Figure 5:
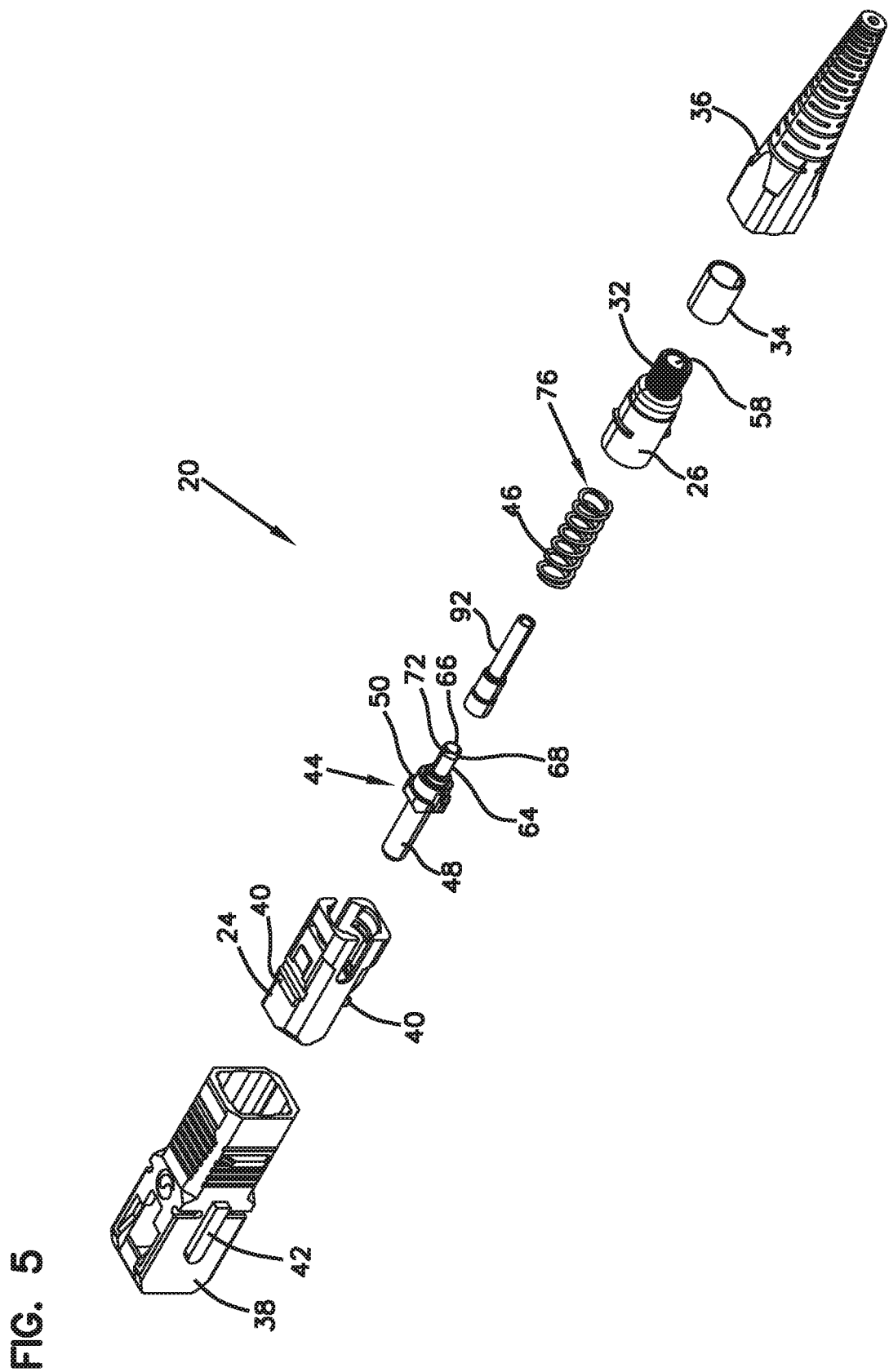
FIG. 5 is an exploded, perspective view of the fiber optic connector of FIG. 1.
Figure 6:
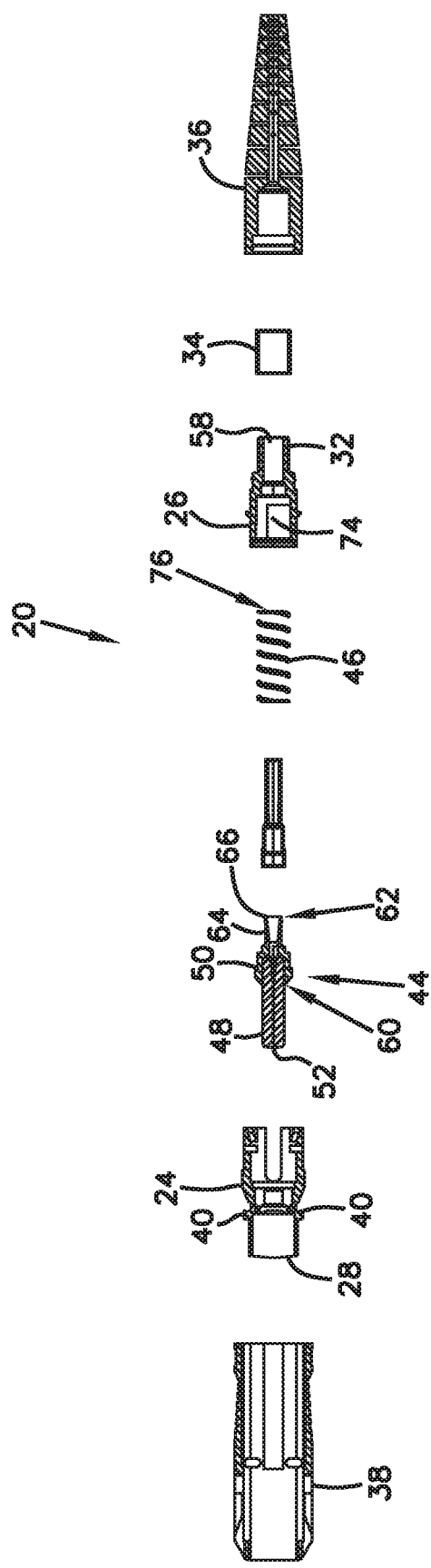
FIG. 6 is an exploded, cross-sectional view of the fiber optic connector of FIG. 3.
Figure 7:
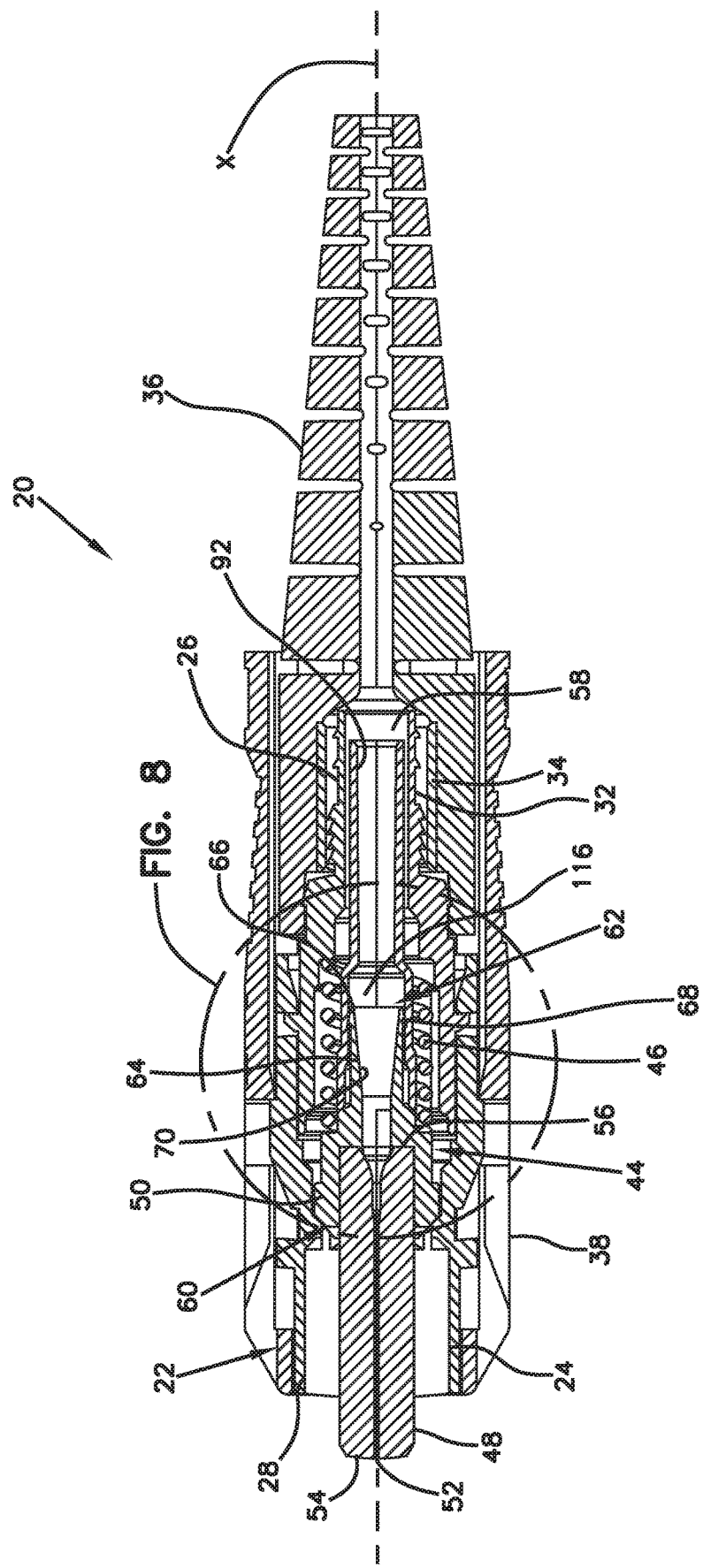
FIG. 7 is a cross-sectional view taken along section line 7-7 of FIG. 3.
Figure 8:
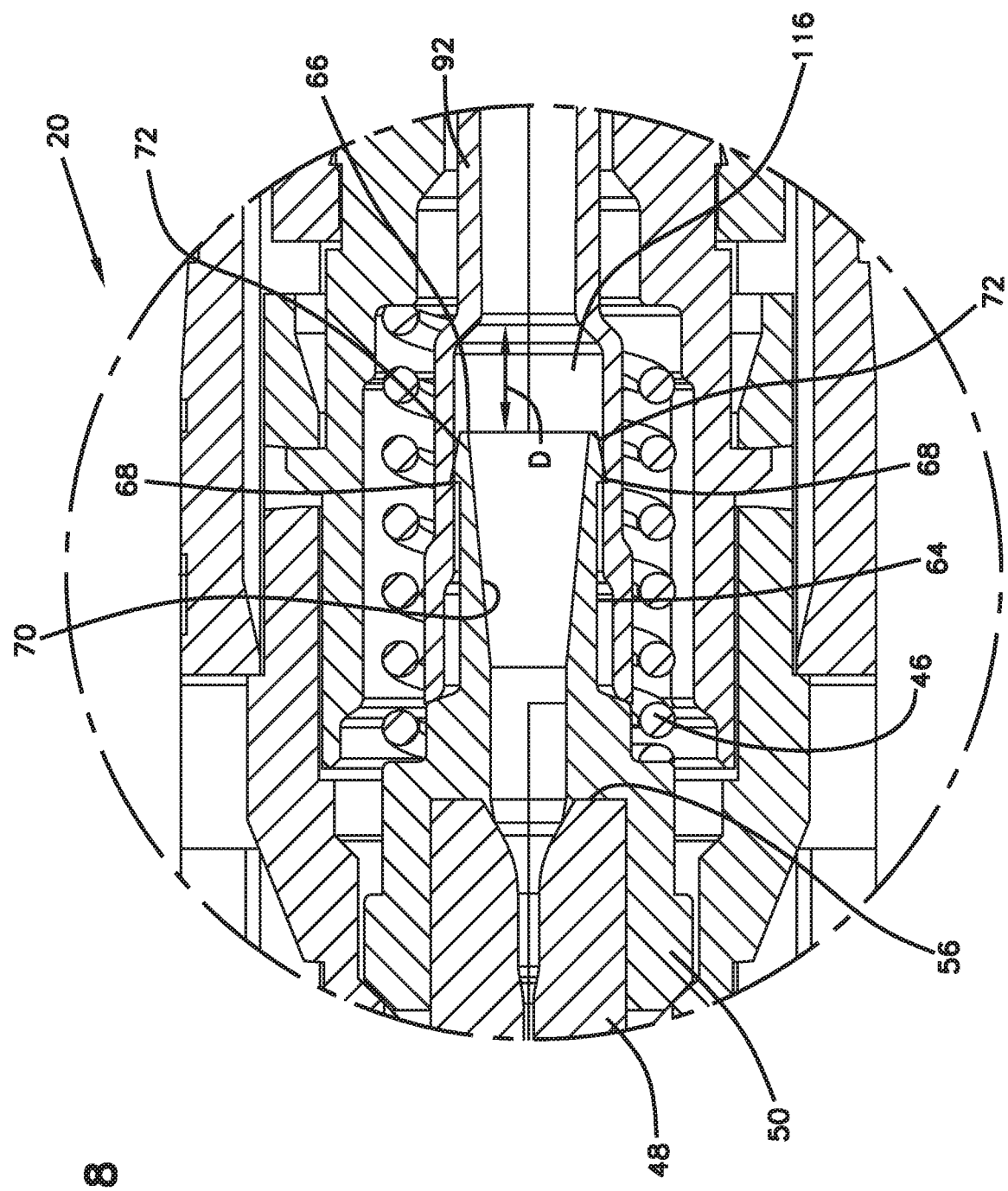
FIG. 8 is an enlarged view of a portion of FIG. 7.

FIGS. 1-8 illustrate a fiber optic connector 20 in accordance with the principles of the present disclosure. The fiber optic connector 20 includes a connector body assembly 22 including a front piece 24 and a rear piece 26 (see FIG. 5). The front piece 24 defines a plug end 28 of the fiber optic connector 20. The plug end 28 is adapted to be inserted within a fiber optic adapter. The rear piece 26 attaches to the front piece 24 (e.g., by a snap-fit connection). The fiber optic connector 20 is configured to be attached to the end of a fiber optic cable 30 (see FIG. 9). The rear piece 26 includes a cable anchoring region 32 to which strength members (e.g., aramid yarn, fiberglass yarn, etc.) can be secured (see FIG. 4).

The rear piece 26 of the fiber optic connector 20 further includes a strain relief boot 36 (e.g., fiber bend radius limiting structure) that mounts at the interface between the fiber optic cable 30 and the rear piece 26. Strain relief boot 36 functions to provide fiber bend radius protection to the fiber optic cable 30 at the interface between the fiber optic cable 30 and the fiber optic connector 20. In one example, a crimp sleeve 34 can be used to crimp the cable strength members to the cable anchoring region 32. That is, once the fiber insertion process has been completed, the crimp sleeve 34 is slid forwardly over the cable anchoring region 32 of the rear piece 26 of the connector body assembly 22 and used to crimp the front end of the strength member layer about the exterior surface of the cable anchoring region 32 of the rear piece 26. The strain relief boot 36 is then slid forwardly over the crimp sleeve 34 and the cable anchoring region 32 of the rear piece 26.

The fiber optic connector 20 is shown as an SC-style fiber optic connector with a release sleeve 38 that mounts over the connector body assembly 22. The release sleeve 38 has a limited range of axial movement relative to the connector body assembly 22 and is configured to facilitate releasing the connector body assembly 22 from a fiber optic adapter. The release sleeve 38 is free to slide back-and-forth in distal and proximal directions relative to the connector body assembly 22 along a central longitudinal axis X between a latching position and a release position. For example, once the fiber optic connector 20 has been inserted within the port of a fiber optic adapter, the release sleeve 38 can be retracted relative to the connector body assembly 22 to disengage latches of the fiber optic adapter from corresponding shoulders 40 on the connector body thereby allowing the fiber optic connector 20 to be withdrawn from the adapter. It will be appreciated that aspects of the present disclosure are also applicable to other types of fiber optic connectors such as LC-style connectors, ST-style fiber optic connectors as well as other types of fiber optic connectors. The release sleeve 38 includes a key 42 that defines the tuned position for the fiber optic connector 20.

The fiber optic connector 20 also includes a ferrule assembly 44 and a spring 46 that mount within the interior of the connector body assembly 22. The ferrule assembly 44 and the spring 46 are captured between the front and rear pieces 24, 26 of the connector body assembly 22. The rear piece 26 may define a receptacle 74 (see FIG. 6) for receiving a rear end 76 of the spring 46. The receptacle 74 acts as a stop that engages the spring 46 such that the spring 46 is compressed.

The ferrule assembly 44 includes a ferrule 48 having a rear end mounted within a hub 50. The ferrule 48 defines an axial bore 52 that extends through the ferrule 48 from a front end 54 to a rear end 56. The spring 46 functions to bias the ferrule assembly 44 in a forward direction. When the ferrule assembly 44 is mounted at least partially within the connector body assembly 22, the front end 54 of the ferrule 48 is accessible at the plug end 28 of the front piece 24 of the connector body assembly 22.

In one example, the ferrule 48 is generally cylindrical. In one example, the ferrule 48 has a diameter in the range of 1-3 millimeters or in the range of 1.25-2.5 millimeters. Example ferrules include SC ferrules and LC ferrules. The front end 54 of the ferrule 48 is positioned distally outwardly beyond the front piece 24 of the connector body assembly 22 and the rear end 56 of the ferrule 48 is positioned within the connector body assembly 22. To provide an effective optical connection between two fiber optic connectors, it is desirable for the fibers of the connected fiber optic connectors to be precisely coaxially aligned such that the cores of the optical fibers coaxially align with one another. In this regard, the axial bores 52 of the ferrules 48 are precisely oriented.

While a single fiber ferrule is depicted, aspects of the present disclosure are also applicable to multi-fiber ferrules such as MT-ferrules and MPO ferrules. A typical multi-fiber ferrule can have a generally rectangular shape and can support a plurality of optical fibers supported in one or more rows by the multi-fiber ferrule.

The fiber optic connector 20 extends along a central longitudinal axis X. The rear piece 26 defines a fiber opening 58 in alignment with the central longitudinal axis X. The hub 50 can include a first end 60 and a second end 62 such that the first end 60 of the hub 50 is configured to mount over the rear end 56 of the ferrule 48. The second end 62 of the hub 50 may include a stem 64 that has a cylindrical body. The stem 64 may extend in a direction toward the rear piece 26 of the connector body assembly 22 and stop at a termination end 66.

In certain examples, the stem 64 may include a radially outwardly extending ramped flange portion or "barb" 68 adjacent the termination end 66 of the hub 50, although alternatives are possible. The stem 64 of the hub 50 may also include an internal surface 70 that includes a taper to facilitate insertion of the fiber optic cable 30 without damage to the fiber optic cable 30. The stem 64 of the hub 50 may also include an opposite external surface 72 that includes the barb 68.

The ferrule 48 is preferably constructed of a relatively hard material capable of protecting and supporting a portion of the optical fiber 78. In one embodiment, the ferrule 48 has a ceramic construction. In certain examples, the hub 50 and the ferrule 48 are manufactured of a polymeric material using a molding process. In one example, the hub 50 and the ferrule 48 can be made of Ultem, thermoplastic materials such as Polyphenylene sulfide (PPS), other engineering plastics or various metals. Other materials and molding processes may be used.

In certain examples, the ferrule 48 and the hub 50 are secured together by convenient methods including press fit or adhesive mounts. In one example, the hub 50 and the ferrule 48 are two separate parts. In other examples, the hub 50 and the ferrule 50 are formed as a single piece. In other words, the hub 50 and the ferrule 48 are a single, integrally molded piece. In certain examples, the hub 50 may be molded over the ferrule 48 to create an overmolded hub.

Figure 9:
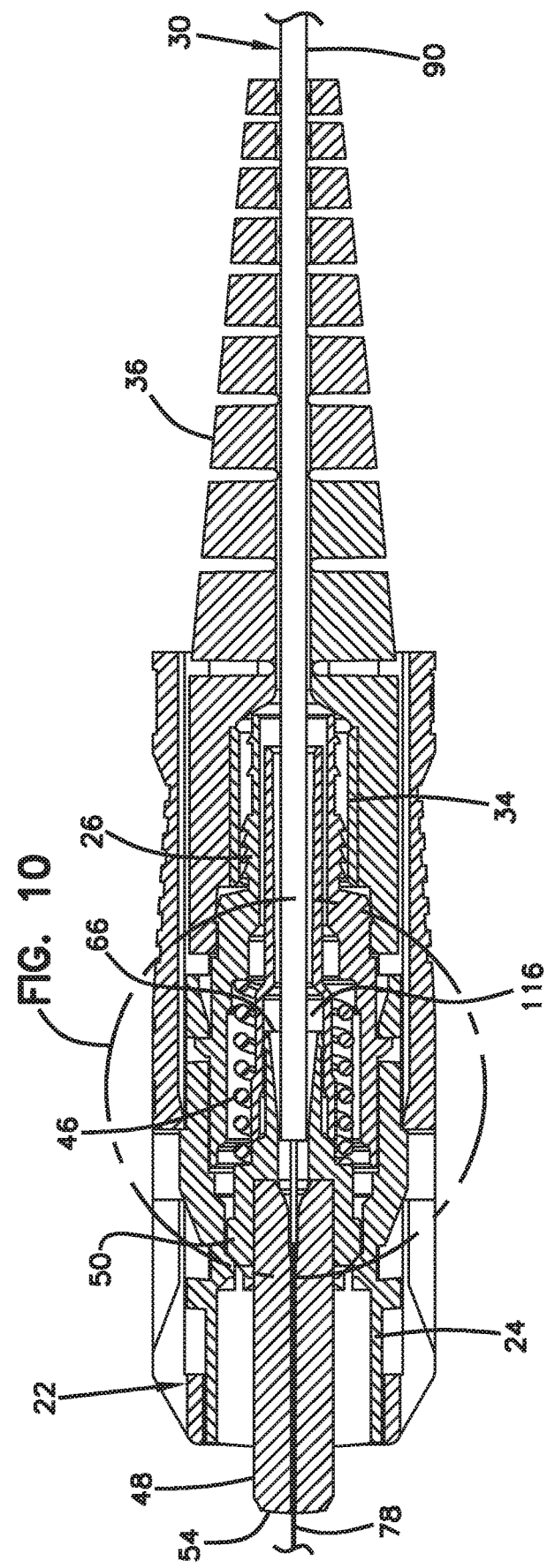
FIG. 9 is a cross-sectional view of the fiber optic connector of FIG. 7 including a fiber optic cable.
Figure 10:
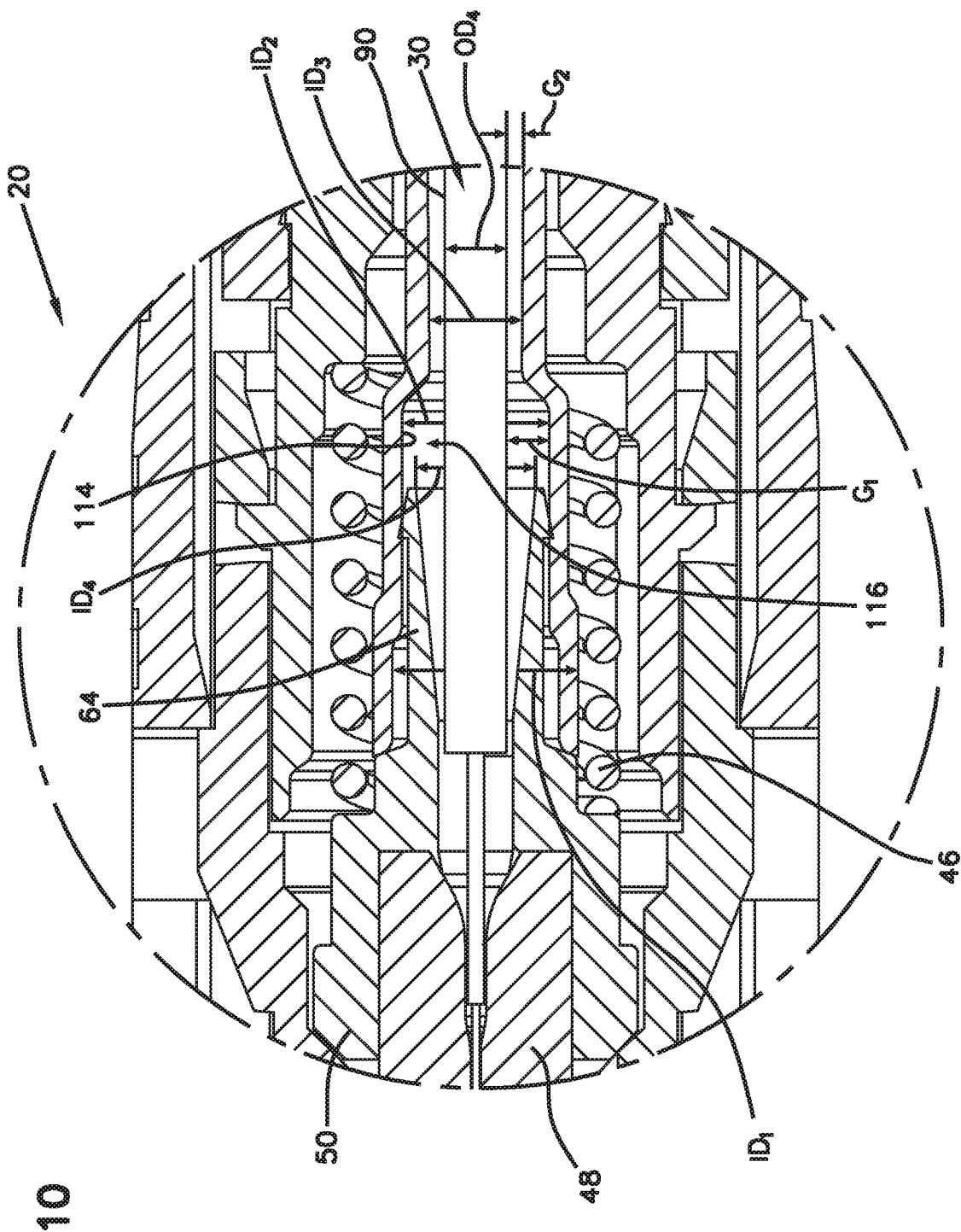
FIG. 10 is an enlarged view of a portion of FIG. 9.

Turning to FIGS. 9 and 10, the fiber optic connector 20 is depicted with the fiber optic cable 30. The fiber optic cable 30 includes an optical fiber 78 that extends through the connector body assembly 22 and is inserted within the axial bore 52 of the ferrule 48. In certain examples, the optical fiber 78 is fixed within the ferrule 48 by potting material such as epoxy.

Figure 11:
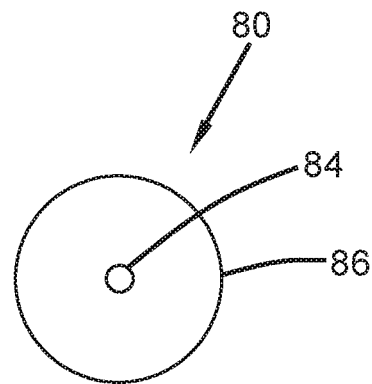
FIG. 11 is a cross-sectional view through a bare glass portion of an optical fiber of the fiber optic cable.
Figure 12:
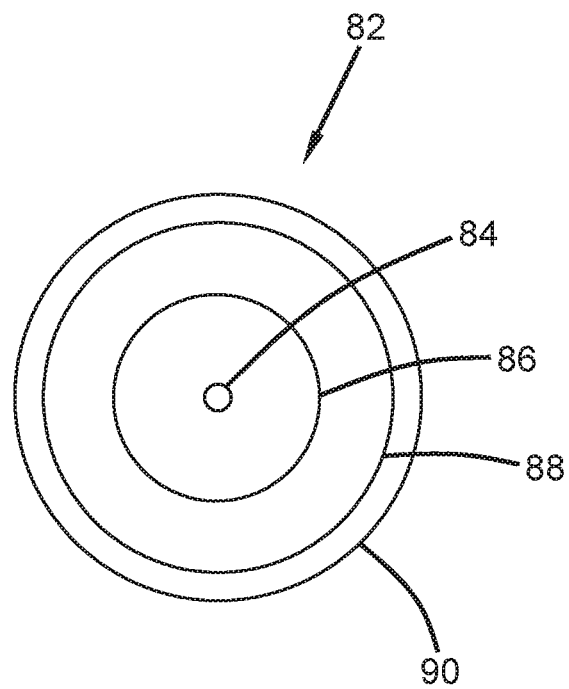
FIG. 12 is a cross-sectional view through a coated portion of the optical fiber.

In certain embodiments, the optical fiber 78 includes a bare glass portion 80 that extends through the ferrule 48 and a coated portion 82 that extends through the remainder of the connector body assembly 22. In one example, the bare glass portion 80 can have a diameter in the range of 120-140 microns and the coated portion 82 can have a diameter greater than 230 microns. In certain examples, the bare glass portion 80 includes a core 84 (see FIG. 11) surrounded by a cladding layer 86, and the coated portion 82 includes the core 84, the cladding layer 86 and one or more coating layers 88 (see FIG. 12). The coated portion 82 can also include a loose or tight buffer tube 90 surrounding the coating layer 88 to provide additional protection. The buffer tube 90 may have an outer diameter of, for example, about 900 microns applied over the coating layer 88 and further protects the fiber. This can also be referred to as upjacketing. Although a single optical fiber 78 is depicted, it will be appreciated that more than one optical fiber 78 may be located within the buffer tube 90, such as two, four, eight, or even up to 24 optical fibers. The optical fiber 78 may be positioned loosely within the buffer tube 90 to provide a "loose-tube arrangement" or may be positioned to provide a "tight-tube" arrangement.

The inner core of the fiber optic cable 30 may include a plurality of strength members. In one example, the plurality of strength members are fibers or yarns that completely surround the buffer tube 90. The yarns may be constructed of aramid yarns, such as those sold under the trademark of Kevlar. In certain examples, the fiber optic cable 30 includes at least on rigid strength member within the inner core.

The axial bore 52 of the ferrule 48 may be sized to receive a terminal end of the fiber optic cable 30, including a portion of the optical fiber 78 and the jacket 90. In some examples, the optical fiber 78 and/or the buffer tube 90 can be fixed within the axial bore 52 using various methods, such as by an adhesive. In other examples, one or both of the optical fiber 78 and the buffer tube 90 may be retained within the axial bore 52 by a frictional fit.

An epoxy injection device (not shown) may be is inserted through the rear piece 26 of the connector body assembly 22 and is used to inject epoxy into the axial bore 52 of the ferrule 48. The injection device may include an injection needle configured to be inserted into the connector body assembly 22 through the rear piece 26 and into the hub 50. The injection needed can be moved within the connector body assembly 22 along the central longitudinal axis X until a tip of the injection needle is positioned adjacent the rear end 56 of the ferrule 48. The injection needle is sized in length such that when the needle abuts the tapering transition portion on the internal surface 70 of the hub 50, the tip of the injection needle may be positioned adjacent the rear end 56 of the ferrule 48.

Figure 13:
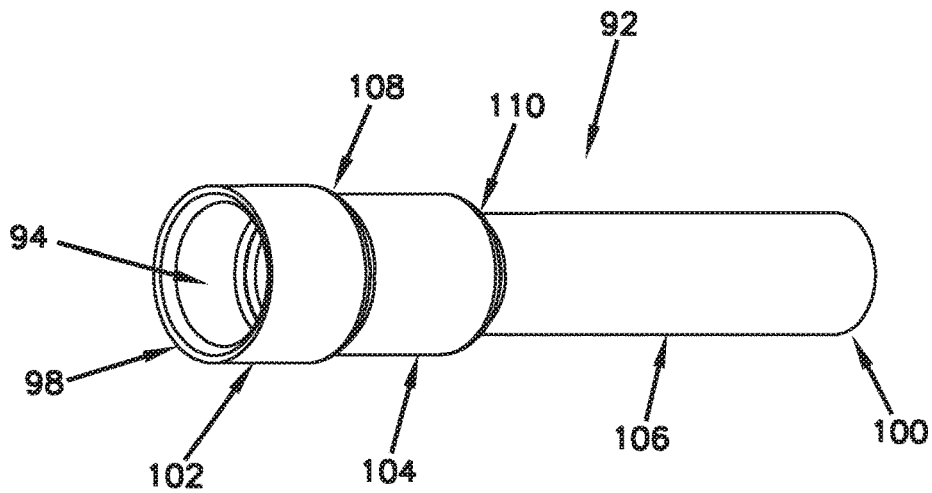
FIG. 13 is a front perspective view of an epoxy tube in accordance with the principles of the present disclosure.
Figure 14:
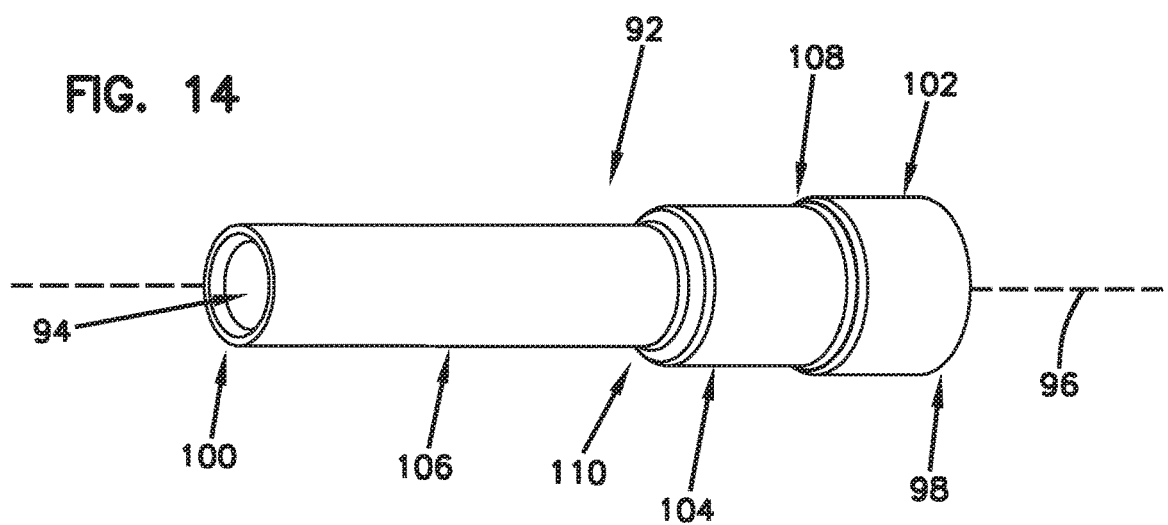
FIG. 14 is a rear perspective view of the epoxy tube of FIG. 13.
Figure 15:
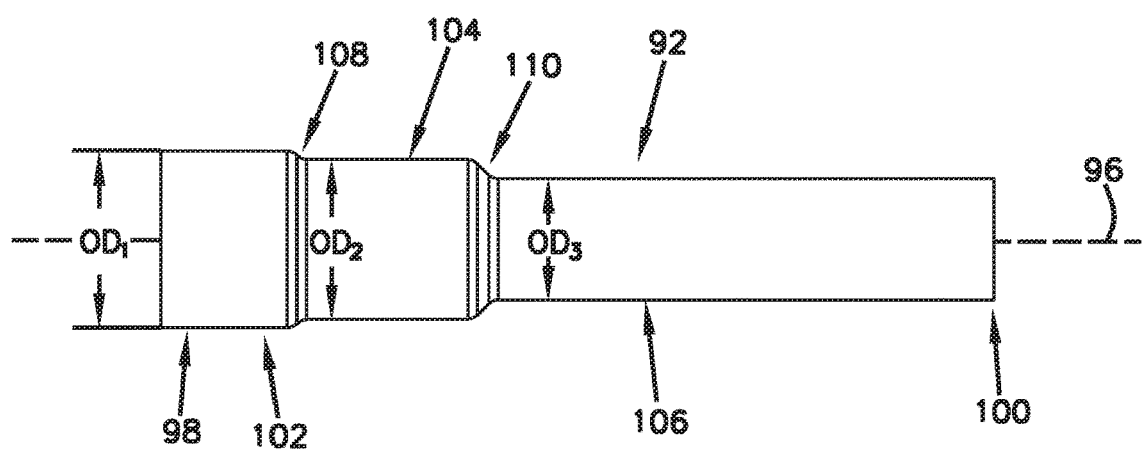
FIG. 15 is a side view of the epoxy tube of FIG. 13.

Referring to FIGS. 13-15, an epoxy tube 92 is depicted in accordance with the principles of the present disclosure. The epoxy tube 92 defines a passage 94 with a tube axis 96 extending therethrough from a proximal end 98 to a distal end 100. The tube axis 96 can align with the central longitudinal axis X. That is, the tube axis 96 and the central longitudinal axis X can be concentric or coaxially aligned. The epoxy tube 92 can be arranged and configured to pass through a central region of the spring 46 to be coupled to the hub 50 before the rear piece 26. The epoxy tube 92 may extend rearwardly towards the strain relief boot 36 to facilitate or guide the insertion of the optical fiber 78 into the ferrule 48.

The epoxy tube 92 may include a first cylindrical section 102 with a first outer diameter $OD_1$, a second cylindrical section 104 with a second outer diameter $OD_2$, and a third cylindrical section 106 with a third outer diameter $OD_3$. The second outer diameter $OD_2$ may be smaller than the first outer diameter $OD_1$ to form a first tapered transition area 108 between the first cylindrical section 102 and the second cylindrical section 104. The third outer diameter $OD_3$ may be smaller than the second outer diameter $OD_2$ to form a second tapered transition area 110 between the second cylindrical section 104 and the third cylindrical section 106.

Turning again to FIG. 10, the fiber optic cable 30 has an outside diameter $OD_4$. The epoxy tube 92 may extend through the first, second, and third cylindrical sections 102, 104, and 106 of the epoxy tube 92 and into a portion of the stem 64 of the hub 50. The first cylindrical section 102 of the epoxy tube 92 may be mounted externally to the stem 64 of the hub 50 to define an interface joint. The epoxy tube 92 may be a "push-on" tube. That is, the epoxy tube 92 may be a separate part that is configured to be pushed onto the hub 50. When the epoxy tube 92 is mounted over the hub 50, the barb 68 located on the external surface 72 of the stem 64 may be positioned adjacent the second cylindrical section 104. The barb 68 of the hub 50 may be configured to function as a retention element that engages the epoxy tube 92 to secure the epoxy tube 92 within the fiber optic connector 20.

The first cylindrical section 102 of the epoxy tube 92 defines a first inner diameter $ID_1$, the second cylindrical section 104 defines a second inner diameter $ID_2$, and a third cylindrical section 106 defines a third inner diameter $ID_3$. The first inner diameter $ID_1$ may be larger than the second inner diameter $ID_2$ and the second inner diameter $ID_2$ may be larger than the third inner diameter $ID_3$. In certain examples, the third inner diameter $ID_3$ of the third cylindrical section 106 is smaller than a largest inner diameter $ID_4$ of the hub 50.

A gap area $G_1$ may be defined between an interior surface 114 of the second inner diameter $ID_2$ of the second cylindrical section 104 and the outer diameter $OD_4$ of the fiber optic cable 30. The gap area $G_1$ may taper down to a narrower gap area $G_2$ within the third inner diameter $ID_3$ of the third cylindrical section 106. The third inner diameter $ID_3$ of the epoxy tube 92 may be sized similar to an outer diameter $OD_4$ of the fiber optic cable 30 such that a small clearance is created therebetween. Due to the close diameter fit between the epoxy tube 92 and the fiber optic cable 30 at the third cylindrical section 106, a capillary effect may occur within the fiber optic connector 20. In certain examples, adhesive may migrate against gravity toward a rear of the fiber optic connector 20. In certain examples, there may be too much adhesive wicking out of the hub 50 which can cause the adhesive to be re-deposited at a distal tip of the epoxy tube 92, or outside of the epoxy tube 92. The capillary effect may also result in too little adhesive being inside of the hub 50.

To help eliminate wicking, the inner diameter of the epoxy tube 92 can be configured wider at the second cylindrical section 104 compared to the third cylindrical section 106 such that the second inner diameter $ID_2$ of the epoxy tube 92 is large enough to prevent a wicking path which may occur in the third inner diameter $ID_3$ of the epoxy tube 92. That is, the gap area $G_1$ between the outer diameter $OD_4$ of the fiber optic cable 30 and the second inner diameter $ID_2$ of the epoxy tube 92 can be sufficient to prevent wicking.

When the epoxy tube 92 is coupled with the hub 50, a pocket 116 may be defined in the second inner diameter $ID_2$ of the second cylindrical section 104 of the epoxy tube 92. The pocket 116 may extend a distance D (see FIG. 8) from the termination end 66 of the stem 64 to the start of the third inner diameter $ID_3$ of the third cylindrical section 106 of the epoxy tube 92. It will be appreciated that the distance D of the pocket 116 may be long enough to help prevent any buildup of adhesive. That is, if the distance D of the pocket 116 defined in the epoxy tube 92 is too short, adhesive buildup may occur which may create a capillary effect in the fiber optic connector 20.

In certain examples, the distance D is at least 1 millimeter, although alternatives are possible. In certain examples, the distance D is no more than 2 millimeters, although alternatives are possible. In certain examples, the distance D is about 1 millimeter. In other examples, the distance D is at least bigger than the largest inner diameter of the hub 50. In certain examples, the epoxy tube 92 may be made with a flexible, plastic material. In some examples, epoxy tubes may be made with a fluoropolymer. Fluoropolymers have very low surface energy and therefore resist the capillary effect.

From the forgoing detailed description, it will be evident that modifications and variations can be made without departing from the spirit and scope of the disclosure.

What is claimed is:

1. A fiber optic connector comprising:
   (a) a connector body assembly that extends along a central longitudinal axis, the connector body assembly including:
      (i) a front piece that defines a plug end; and
      (ii) a rear piece defining a fiber opening in alignment with the central longitudinal axis;
      (iii) the rear piece being secured within the front piece;
   (b) a ferrule positioned at least partially within the connector body assembly;
      the ferrule having a front end and an opposite rear end;
      (ii) the ferrule defining an axial bore that extends through the ferrule from the front end to the rear end of the ferrule;
   (c) a hub having a first end and a second end, the first end of the hub being mounted over the rear end of the ferrule; and
   (d) an epoxy tube mounted over the second end of the hub, the epoxy tube defining a passage with a longitudinal axis extending therethrough, the epoxy tube defining a first cylindrical section defining a constant proximal inner diameter, a second cylindrical section defining a constant distal inner diameter, and an inner sloped central transition portion extending between the first cylindrical section defining the constant proximal inner diameter and the second cylindrical section defining the constant distal inner diameter;
   (e) wherein the epoxy tube also defines a pocket having a length between the second end of the hub and the start of the constant distal inner diameter to reduce capillary action between the hub and the epoxy tube; and
   wherein the constant distal inner diameter is less than the constant proximal inner diameter, wherein the entirety of the inner sloped central transition portion is positioned distal of the second end of the hub, and wherein the entirety of the inner sloped central transition portion is positioned within and at least partially defines the pocket.

2. The fiber optic connector of claim 1, wherein the length of the pocket is no more than 1 mm.

3. The fiber optic connector of claim 1, wherein the length of the pocket is larger than a largest inner diameter of the hub.

4. The fiber optic connector of claim 1, further comprising a spring for biasing the ferrule in a forward direction, the spring being retained within the connector body assembly by the rear piece.

5. The fiber optic connector of claim 4, wherein the rear piece defines a receptacle for receiving a rear end of the spring.

6. The fiber optic connector of claim 1, wherein the rear piece and the front piece are secured together by a snap-fit connection interface.

7. The fiber optic connector of claim 1, wherein the fiber optic connector is an SC-type connector.

8. The fiber optic connector of claim 1, wherein the ferrule is an SC-type ferrule.

9. The fiber optic connector of claim 1, wherein the rear piece includes a strain relief boot for providing fiber bend radius protection.

10. The fiber optic connector of claim 1, further comprising a release sleeve that mounts over the connector body assembly.

11. A fiber optic connector comprising:
    (a) a connector body assembly that extends along a central longitudinal axis, the connector body assembly including:
       (i) a front piece that defines a plug end; and
       (ii) a rear piece defining a fiber opening in alignment with the central longitudinal axis;
       (iii) the rear piece being secured within the front piece;
    (b) a ferrule positioned at least partially within the connector body assembly;
       the ferrule having a front end and an opposite rear end;
       (ii) the ferrule defining an axial bore that extends through the ferrule from the front end to the rear end of the ferrule;
    (c) a hub having a first end and a second end, the first end of the hub being mounted over the rear end of the ferrule, the second end of the hub having a stem with a cylindrical body that extends in a direction toward the rear piece of the connector body assembly and stops at a termination end, the stem including a barb adjacent the termination end, wherein the stem has an internal surface that includes a taper and an opposite external surface that includes the barb;
    (d) an epoxy tube having a first cylindrical section that defines a constant first inner diameter, a second cylindrical section that defines a constant second inner diameter, and a third cylindrical section that defines a constant third inner diameter, the first constant inner diameter being larger than the second constant inner diameter and the second constant inner diameter being larger than the third constant inner diameter;
    (e) wherein the barb is positioned adjacent the second cylindrical section, wherein the third constant inner diameter of the third cylindrical section is smaller than a largest inner diameter of the hub; and
    wherein the first cylindrical section includes a constant first outer diameter, the second cylindrical section includes a constant second outer diameter, and the third cylindrical section includes a constant third outer diameter, the third constant outer diameter of the third cylindrical section being smaller than the second constant outer diameter of the second cylindrical section and forming a tapered transition area between the second cylindrical section and the third cylindrical section;
    (g) a fiber optic cable having an outside diameter, the fiber optic cable extending through the first, second, and third cylindrical sections of the epoxy tube and into a portion of the stem of the hub, wherein a gap area is defined between an interior surface of the second constant inner diameter of the second cylindrical section and the outside diameter of the fiber optic cable, the gap area tapering down to a narrower gap in the third constant inner diameter of the third cylindrical section; and
    (h) a pocket being defined from the termination end of the stem to the start of the third cylindrical section of the epoxy tube, wherein the entirety of the gap area that tapers down to the narrower gap in the third constant inner diameter of the third cylindrical section is positioned distal of the second end of the hub, and wherein the entirety of the gap area defining the taper down to the narrower gap is positioned within and at least partially defines the pocket.

12. The fiber optic connector of claim 11, wherein the pocket has a length of no more than 1 mm.

13. The fiber optic connector of claim 11, wherein the length of the pocket is larger than an inner diameter of the hub.

14. The fiber optic connector of claim 11, further comprising a spring for biasing the ferrule in a forward direction, the spring being retained within the connector body assembly by the rear piece.

15. The fiber optic connector of claim 14, wherein the rear piece defines a receptacle for receiving a rear end of the spring.

16. The fiber optic connector of claim 11, wherein the rear piece and the front piece are secured together by a snap-fit connection interface.

17. The fiber optic connector of claim 11, wherein the fiber optic connector is an SC-type connector.

18. The fiber optic connector of claim 11, wherein the ferrule is an SC-type ferrule.

19. The fiber optic connector of claim 11, wherein the rear piece includes a fiber bend radius limiting structure for providing the fiber optic cable with fiber bend radius protection.

20. The fiber optic connector of claim 11, further comprising a release sleeve that mounts over the connector body assembly.

21. A fiber optic connector comprising:
    (a) a connector body assembly that extends along a central longitudinal axis;
    (b) a ferrule positioned at least partially within the connector body assembly;
        (i) the ferrule having a front end and an opposite rear end;
        (ii) the ferrule defining an axial bore that extends through the ferrule from the front end to the rear end of the ferrule;
    (c) a hub having a first end and a second end, the first end of the hub being mounted over the rear end of the ferrule; and
    (d) an epoxy tube mounted over the second end of the hub, the epoxy tube defining a passage with a longitudinal axis extending therethrough, the epoxy tube defining a first cylindrical section defining a constant proximal inner diameter, a second cylindrical section defining a constant distal inner diameter, and an inner sloped central transition portion extending between the first cylindrical section defining the constant proximal inner diameter and the second cylindrical section defining the constant distal inner diameter;
    (e) wherein the epoxy tube also defines a pocket having a length between the second end of the hub and the start of the constant distal inner diameter to reduce capillary action between the hub and the epoxy tube;
    (f) wherein the constant distal inner diameter is less than the constant proximal inner diameter; and
    (g) a fiber optic cable positioned in the ferrule, the hub, and the epoxy tube, wherein there is a spacing around the cable, wherein the epoxy tube faces the cable and is spaced a greater distance from the cable at a first location adjacent to a distal end of the hub, relative to a distance at a second location spaced further from the distal end of the hub in a direction toward a distal end of the epoxy tube, wherein the pocket is formed by the epoxy tube and the fiber optic cable at the first location, wherein the entirety of the inner sloped central transition portion is positioned distal of the second end of the hub, and wherein the entirety of the inner sloped central transition portion is positioned within and at least partially defines the pocket.

22. The fiber optic connector of claim 21, wherein the length of the pocket is no more than 1 mm.

23. The fiber optic connector of claim 21, wherein the length of the pocket is larger than a largest inner diameter of the hub.

24. The fiber optic connector of claim 21, further comprising a spring for biasing the ferrule in a forward direction.

25. The fiber optic connector of claim 21, wherein the fiber optic connector is an SC-type connector.

* * * * *

UNITED STATES PATENT AND TRADEMARK OFFICE
CERTIFICATE OF CORRECTION

PATENT NO. : 12,019,283 B2
APPLICATION NO. : 17/627597
DATED : June 25, 2024
INVENTOR(S) : Steven Conrad Zimmel et al.

Page 1 of 1

It is certified that error appears in the above-identified patent and that said Letters Patent is hereby corrected as shown below:

In the Claims

Column 7, Line 21, Claim 1: before "the ferrule" insert --(i)--

Column 8, Line 17, Claim 11: before "the ferrule" insert --(i)--

Column 8, Line 42, Claim 11: before "wherein the" insert --(f)--

Signed and Sealed this
Eighth Day of October, 2024

Katherine Kelly Vidal
*Director of the United States Patent and Trademark Office*